Oct. 24, 1950 H. KLING 2,527,014
HOT SAW
Filed Jan. 21, 1947

INVENTOR.
HENRY KLING.
BY
Brown, Critchlow, Flick & Peckham
his ATTORNEYS.

Patented Oct. 24, 1950

2,527,014

UNITED STATES PATENT OFFICE 2,527,014

HOT SAW

Henry Kling, Etna, Pa., assignor to The National Supply Company, Pittsburgh, Pa., a corporation of Pennsylvania Application January 21, 1947, Serial No. 723,331

4 Claims. (Cl. 29—104)

The invention relates to rotary disk saws for cutting highly heated metal pipe and tubing, particularly that made by a continuous process.

In the manufacture of butt weld pipe by the continuous process disclosed in the Moon Patent No. 1,476,632, the pipe in continuous form is delivered in a highly heated state by the forming, welding, and preliminary sizing rolls, and while being so delivered it is cut into desired lengths by a rotary disk saw that is borne by a carriage which intermittently travels with and at the speed of the delivered pipe while the saw is moved transversely of the pipe to cut through it. The invention has particularly to do with saws for thus cutting such heated pipe.

In the use of such saws as heretofore made, burr metal frequently adheres to the cut ends of the pipe, the removal of which to render the pipe suitable for use requires additional operations that increase the cost of manufacture. The burr metal of a pipe is the portion of the metal that is removed during a sawing operation, and in pipes of the same diameter and wall thickness the total amount of burr metal depends upon the thickness of the saw. It is variable portions of this burr metal that frequently adheres to the cut ends of pipe.

The object of this invention is to provide a rotary saw for cutting hot metal pipe that will make clean cuts without leaving burr metal on the pipe.

Figure 1:
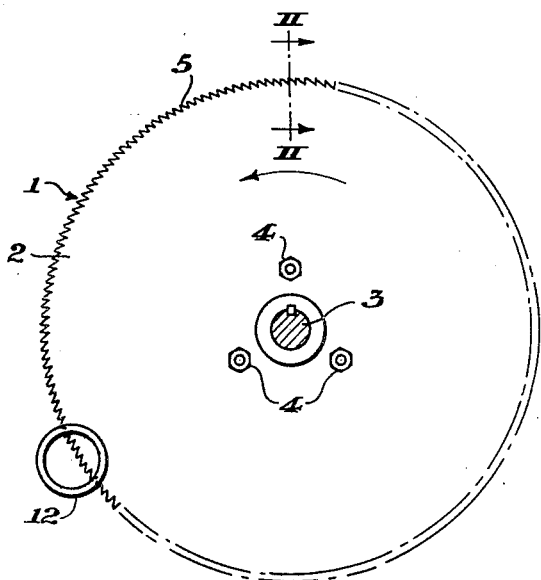
Figure 2:
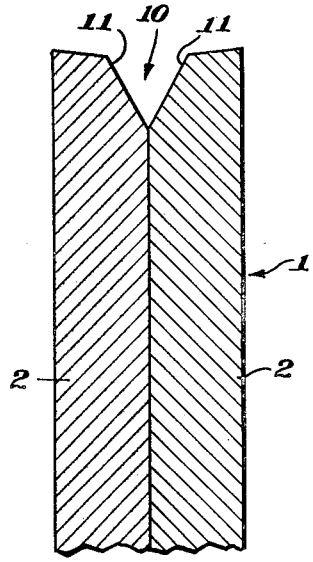
Figure 3:
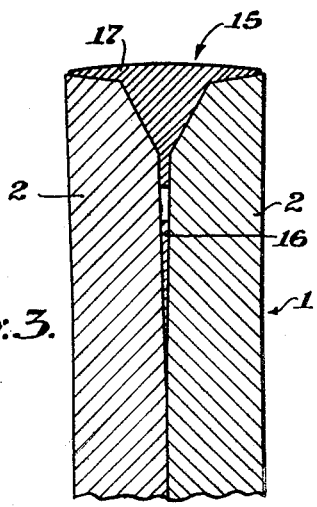
Figure 4:
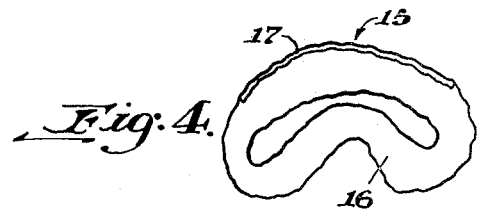

The invention is illustrated in the accompanying drawings, of which Fig. 1 is a face view of a disk saw and an end view of a pipe partially cut by it; Fig. 2 a sectional view to enlarged scale of the peripheral portions of the saw, the plane of view being indicated by the line II—II, Fig. 1; Fig. 3 a view similar to Fig. 2 showing in transverse section the burr metal momentarily retained by the saw at the completion of a cutting operation; Fig. 4 a face view to reduced scale of the slug of burr metal shown in section in Fig. 3; and Fig. 5 a view similar to Fig. 2 showing a modification of construction.

Having reference first to Fig. 1, a disk saw 1 of the type here contemplated may comprise two like disks 2 that are positioned face-to-face and clamped together at their central portions so that they operate as a unit. They are mounted on a driven shaft 3 and are usually provided near their centers with registering holes that receive bolts 4 to clamp the disks together and cause them to operate as a unit. The periphery of each disk is provided with saw teeth 5. By way of example, and not of limitation, such saws for cutting hot pipe from one-half to four inches in diameter vary from about twenty to twenty-four inches in diameter, from one-quarter to three-eighths of an inch in total thickness, and are provided with teeth of from about one-eighth to three-eighths of an inch in depth, measured radially from their outer ends to the bottoms of the notches between them.

According to this invention, the central portion of the periphery of a disk saw of the type here contemplated is provided with an outwardly flaring groove 10 that is preferably V-shape in form having its sides 11 at an angle of not more than about 60° to each other. At its outer end this groove is about one-half of the total thickness of the saw, and adjoining the outer end of the groove the peripheral face of the saw is slightly inclined towards the groove at an angle of not more than about 10° to the axis of the saw.

When a saw such as that shown in Fig. 2 cuts through a pipe 12 in the manner generally indicated in Fig. 1, the walls of groove 10 divert burr metal inwardly of the outer side faces of the saw and force it between the disks at the bottom of the groove, the disks then springing away from each other sufficiently to receive burr metal. After the saw has broken through the pipe at the conclusion of a cutting operation, the centrifugal force of the rotating saw throws the burr from the saw, thus placing the saw in condition for a subsequent cut.

Fig. 3 shows a burr 15 engaged by a saw 1 between its disks 2 at the time the saw breaks through a pipe, a portion of the burr being between the disks 2 which have sprung apart to receive it. A face view of the general shape of the burr is shown in Fig. 4, the burr being a continuous section of the pipe having a flat portion 16 which lies between the disks and a thickened and flanged portion 17 formed in groove 10. As has been stated, this burr in slug form is thrown from the saw by its centrifugal force just after the break through.

Figure 5:
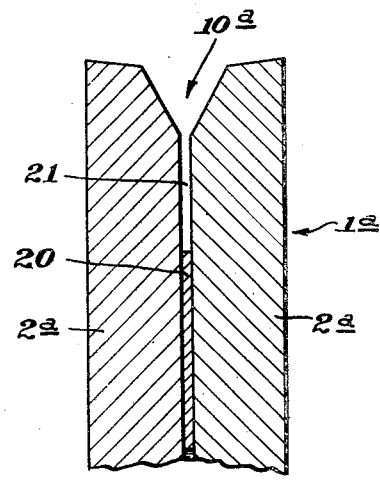

Fig. 5 shows, in radial section similar to Fig. 2, the peripheral portion of a modified form of saw in which the saw 1a is formed of two disks 2a having a spacer disk 20 between them, the spacer being of less diameter than the saw disks so that a narrow groove 21 is formed between the saw disks adjacent to the inner end of a peripheral groove 10a. The depth of groove 21 is not less than about the diameter of the pipe to be cut. The operation of this saw is the same as that of the double disk saw explained above. The saw shown in Fig. 5 has been used successfully in cutting pipe up to about one inch in diameter, while the saw shown particularly in Fig. 3 has been successfully used in cutting pipe of larger diameter, including pipe four inches in diameter.

According to the provisions of the patent statutes, I have explained the principle and mode of operation of my invention, and have illustrated and described what I now consider to be its best embodiments. However, I desire to have it understood that, within the scope of the appended claims, my invention may be practiced by other forms than those specifically illustrated and described.

I claim:

1. A rotary saw for cutting hot metal pipe, comprising a disk having peripheral saw teeth and plain outer side faces at its edges and being provided with a peripheral portion that is divided centrally from its cutting edge towards its axis of rotation in a plane perpendicular to said axis a radial distance not less than about the diameter of the pipe to be cut, the periphery of the saw being provided centrally with an outwardly flaring relatively deep groove formed to divert hot burr metal from the pipe as a unitary slug towards the center of the face of the saw and to force it between said peripheral divided portion of the saw.

2. A rotary saw for cutting hot metal pipe, comprising a pair of disks of equal diameter and thickness clamped together centrally face-to-face and each provided with peripheral teeth and a plain outer side face at its edge, the periphery of the saw being provided centrally with an outwardly flaring groove formed to divert hot burr metal from the pipe as a unitary slug towards the center of the cutting face of the saw and to force such metal between the portions of the disks adjacent to the periphery of the saw, said slug being removed from the saw by the centrifugal force of its rotation at the completion of cuts made by the saw.

3. A rotary saw for cutting hot metal pipe, comprising a pair of disks of equal diameter and thickness clamped together centrally face-to-face and each provided with peripheral saw teeth and a plain outer side face at its edge, the periphery of the saw being provided with an outwardly flaring V-shaped groove whose walls are at not more than about 60° to each other, such groove being formed to divert hot burr metal from the pipe as a unitary slug towards the center of the cutting face of the saw and to force such metal between the portions of the disk adjacent to the periphery of the saw.

4. A rotary saw for cutting hot metal pipe, comprising a pair of disks of equal diameter and thickness clamped together centrally and each provided with peripheral teeth and a plain outer side face at its edge, the periphery of the saw being provided centrally with an outwardly flaring V-shaped groove formed to divert hot burr metal from the pipe as a unitary slug towards the center of the cutting face of the saw and to force such metal between the portions of the disks adjacent to the periphery of the saw, and a spacing disk between the adjacent faces of the saw disks forming with the saw disks a narrow flat groove adjoining the base of said V-shaped groove.

HENRY KLING.

REFERENCES CITED

The following references are of record in the file of this patent:

UNITED STATES PATENTS

| Number | Name | Date |
| --- | --- | --- |
| 1,492,347 | Beisser | Apr. 29, 1924 |

FOREIGN PATENTS

| Number | Country | Date |
| --- | --- | --- |
| 425,050 | France | Mar. 28, 1911 |